(12) United States Patent
Callebert et al.

(10) Patent No.: US 6,261,458 B1
(45) Date of Patent: *Jul. 17, 2001

(54) SYSTEM FOR ALTERNATELY MERGING AT LEAST FOUR FLUIDS AND ITS APPLICATION IN A SEPARATION PROCESS IN A SIMULATED MOVING BED

(75) Inventors: Olivier Callebert, Rueil-Malmaison; Gérard Hotier, Chaponost, both of (FR)

(73) Assignee: Institut Francais du Petrole, Rueil Malmaison Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,906

(22) Filed: Jul. 29, 1999

(30) Foreign Application Priority Data

Jul. 31, 1998 (FR) .................................................. 98 09824

(51) Int. Cl.[7] .................................................. B01D 15/08
(52) U.S. Cl. ..................... 210/659; 210/661; 210/123; 208/310 R; 208/345; 585/825
(58) Field of Search ............................ 210/659, 661, 210/690, 136, 123, 142, 254, 284; 203/44; 208/310 R, 345, 346, 91, 99; 585/820, 825

(56) References Cited

U.S. PATENT DOCUMENTS

| | | | |
|---|---|---|---|
| 2,985,589 * | 5/1961 | Broughton et al. ................... | 210/34 |
| 3,040,777 * | 6/1962 | Carson et al. ................... | 137/625.15 |
| 3,422,848 * | 1/1969 | Liebman et al. ................. | 137/625.15 |
| 3,580,540 * | 5/1971 | Heinen ................................. | 251/159 |
| 3,706,812 * | 12/1972 | Derosset et al. ............... | 260/674 SA |
| 4,021,499 * | 5/1977 | Bieser ............................. | 260/674 SA |
| 4,036,745 * | 7/1977 | Broughton ........................ | 208/310 Z |
| 4,378,292 * | 3/1983 | Haase ................................... | 210/266 |
| 4,434,051 * | 2/1984 | Golem ................................. | 210/264 |
| 4,774,977 * | 10/1988 | Cohen ................................. | 137/271 |
| 5,294,052 * | 3/1994 | Kukesh ................................ | 239/112 |
| 5,422,007 * | 6/1995 | Nicoud et al. ..................... | 210/659 |
| 5,630,943 * | 5/1997 | Grill .................................... | 210/659 |
| 5,635,072 * | 6/1997 | Moran ................................. | 210/659 |
| 5,667,693 * | 9/1997 | Hester et al. ...................... | 210/635 |
| 5,755,960 * | 5/1998 | Callebert et al. ................. | 210/198.2 |
| 5,822,523 * | 3/1999 | Hotier et al. ...................... | 210/659 |
| 5,879,137 * | 3/1999 | Yie ...................................... | 417/225 |
| 5,902,486 * | 5/1999 | Couenne et al. .................. | 210/659 |
| 6,069,289 * | 5/2000 | Dandekar et al. ................. | 585/820 |

* cited by examiner

*Primary Examiner*—Bekir L. Yildirim
(74) *Attorney, Agent, or Firm*—Millen, White, Zelano & Branigan, P.C.

(57) ABSTRACT

A system that makes it possible to merge at least four fluids with a column for separating a feedstock, for example, in a simulated moving bed, comprises at least one trunnion-mounted ball valve, whereby this valve comprises at least one means that makes it possible to circulate one or more fluids, this fluid is placed inside the valve to ensure communication between two zones of the column or between at least one of said zones and at least one point that is outside of the column, and several openings ($O_A$, $O_B$) that are placed to ensure the circulation of fluids according to the stages that are necessary to the separation process that is carried out in said column.

26 Claims, 5 Drawing Sheets

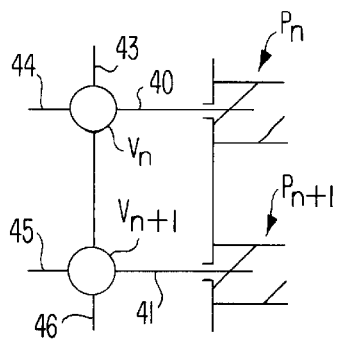
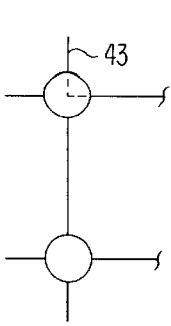
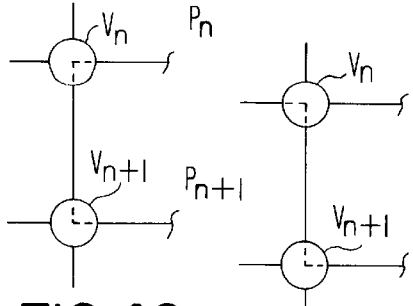
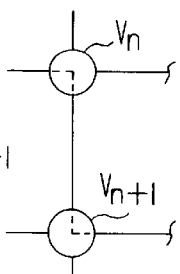
FIG.4A  FIG.4B  FIG.4C  FIG.4D
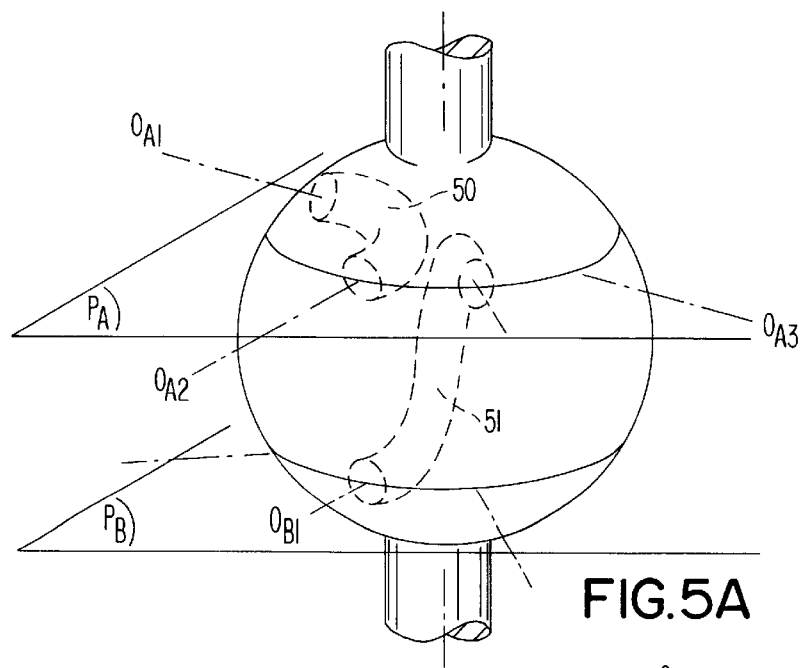
FIG.5A
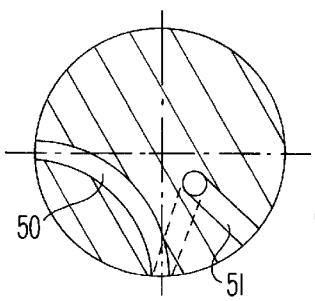
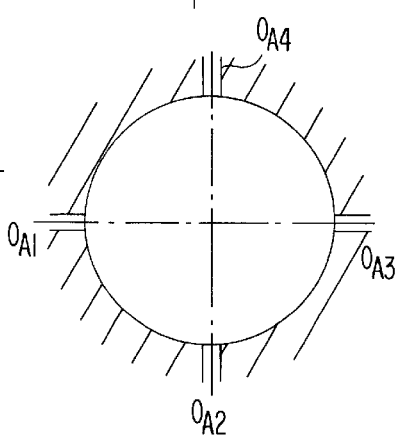
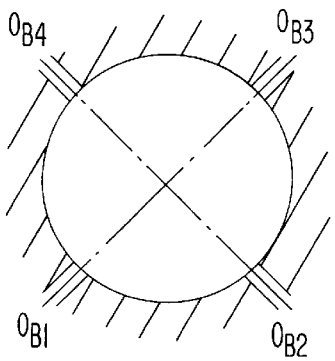
FIG.5B  FIG.5C  FIG.5D

SYSTEM FOR ALTERNATELY MERGING AT LEAST FOUR FLUIDS AND ITS APPLICATION IN A SEPARATION PROCESS IN A SIMULATED MOVING BED

The invention relates to a device that is used for alternately merging several streams of fluid, that enters a zone for bringing it into contact or that exits the zone, with at least one trunnion-mounted ball valve.

The invention is applied particularly within the framework of a process for separating a feedstock that uses several adsorbent beds to circulate the stream or flow of the feedstock, the stream of the extract, the stream of the raffinate, the stream of the desorbent and various flows that circulate between two beds. In this case, the trunnion-mounted ball comprises, for example, at least three fluid connections.

It pertains more particularly to an improved process for separation in a simulated moving bed, such as the one that is described in the patent application of the applicant (FR-97/16,273), where the purity of a product is improved by using a synchronous by-pass. The technical teaching of this application is incorporated with reference.

It also finds its application in all sorts of processes where several streams of fluid circulate from the outside toward a zone of a device where a reaction is carried out or else from a zone toward the outside, or else between several zones of the device.

The invention thus can be used in various processes of chemistry, petrochemistry or else in other areas.

It pertains more particularly to the separation of paraxylene from aromatic hydrocarbon feedstocks with eight carbon atoms.

The invention relates to a DME that can be used in a process for separating paraxylene in a simulated moving bed into a mixture of xylenes and ethylbenzene that contains, with respect to the terephthalic acid synthesis, an intermediate petrochemical in the production of textiles.

The technological background that illustrates the use of an adsorption device with simulated countercurrent is described in, for example, U.S. Pat. No. 2,985,589. In this device, a main fluid that is introduced by a pump circulates along the central axis of a column that contains a solid mass of adsorbent. The flow of this fluid is of piston type (plug flow), so that its composition and its front flow are approximately uniform at all points of a given section of the column.

To attain this type of flow, it is possible to use a device for distributing and mixing fluids as described in U.S. Pat. Nos. 3,214,247 or 4,378,292, whose teachings are incorporated with reference.

In a brief and diagrammatic manner, the device generally comprises a number of adsorbent beds that are fed by a number of distributor plates, whereby each bed is supported by an upper lattice that is placed approximately perpendicular to the axis of the reactor and makes possible the flow of the fluid. Each plate is divided into sectors and each distributor plate segment comprises two non-perforated deflectors that are flat or have a variable thickness and that are placed on the same horizontal plane, between which is placed a space for circulation of the fluid. A lower lattice that is positioned under the deflectors makes it possible to distribute the fluid uniformly into the lower adsorbent bed.

At each distribution plate, at least four transfer lines of secondary fluids (a feedstock injection line, a desorbent injection line, a line for draw-off of an extract or a line for draw-off of a raffinate) that comprise a set of valves are connected to means for swapping out this set of valves.

The injections and the draw-offs of these secondary fluids are carried out among certain beds, and with a regular space of time called period T, introduction and draw-off points that delimit the zones of the interval are moved between beds (Ck) and (Ck+1) in the interval between beds (Ck+1) and (Ck+2).

If n is the number of beds, n*T defines the cycle time.

A pump ensures the recycling of the fluid of the low end of the column toward its upper end.

The secondary fluids, for example the feedstock or the desorbent, are introduced or drawn off for the extract or the raffinate, in or from the circulation space by an introduction or draw-off chamber that is pierced with orifices.

The distribution of fluids over each of the beds requires a collection of the main flow that originates from the previous bed (main flow), the possibility of injecting a supplementary fluid there while mixing these two streams as well as possible, the possibility of sampling a fluid portion that is collected to send it toward the outside and a redistribution over the next bed. To do this, it is possible either to send the entire main flow through the inside of the adsorber according to the diagram that is described in U.S. Pat. No. 2,985,589, or to bring out this entire flow toward the outside to make it enter the adsorber toward the next stage as in U.S. Pat. No. 5,200,075.

According to the teaching of the patent application of the applicant FR-97/16,273, the majority of the main flow is sent toward the inside, and a small minority of this flow is sent toward the outside, typically 2 to 20%, so that the secondary fluids that circulate in the circuits for injecting and for sampling fluids continuously have approximately the same composition as the main fluid. For this purpose, the device is provided with an outside circuit that is known under the name of synchronous by-pass. In this circuit, all-or-nothing valves for sampling secondary fluids, a non-return valve and optionally an all-or-nothing valve are branched so that the injections and draw-offs are made on a single plate at the same time.

Although effective, such a circuit exhibits several drawbacks, however. It actually generates dead volumes in a T shape on the synchronous by-pass. It requires the use of several mechanical devices, for example a nonreturn valve, a valve for segregating injections and draw-offs between one plate and the next or the previous plate, all-or-nothing valves that are used for merging the secondary flows and the portion of the main flow that circulates in the synchronous by-pass. All of these devices increase the cost of the installation, its volume and the cost of its maintenance, whereby the by-pass valves and the nonreturn valve are particularly stressed mechanically.

U.S. Pat. No. 4,434,051 describes the use of valves that comprise at least three paths that are arranged in three groups to minimize the number of valves that are usually used to rinse the lines that are effective for a separation device where the entire main flow is sent into the adsorber and the secondary fluids are distributed with a single distribution basket via an adsorbent bed.

The object of this invention consists in using trunnion-mounted valves, whereby the number and the arrangement of these valves is based on the sequence that makes it possible to carry out the separation in a simulated moving bed.

The object of this invention relates to a system that makes it possible to merge at least four fluids with a column for separating a feedstock, whereby said column comprises several hoses for introducing or drawing off one or more fluids.

It is characterized in that it comprises at least one trunnion-mounted valve, whereby said valve comprises at least one means that makes it possible to circulate one or more fluids, whereby said means is placed inside said valve to ensure communication between two zones of said column or between at least one of said zones and at least one point that is outside of said column and several openings ($O_A$, $O_B$) are placed to ensure the circulation of the fluids according to the stages that are necessary to the process for separation that is carried out in said column.

Said circulation means and said openings are found, for example, in the same plane of the valve.

The valve can comprise at least three communication paths and at least two active positions.

The valve comprises, for example, at least four communication paths and at least three active positions.

The circulation means between two zones comprise at least one channel that is placed in a first plane (meridian) of said valve to ensure the connection between two zones of the column and at least one channel that is placed between said first plane and a second plane (meridian) to ensure the communication between at least one of the zones of said column and at least one point that is outside of said column, and in that said openings are divided and distributed at two planes (the channels are independent).

According to an embodiment, the valve comprises eight fluid connections and eight active positions.

The valve can comprise at least one purge line in connection with said communication channel.

The system can be used for a column that comprises one or more by-pass lines (Li,j) that equip said separation column, whereby said by-pass line or lines are placed between at least two plates Pi, Pj of said separation column.

The object of the invention also relates to a device for separating a feedstock in a simulated moving bed, whereby the device comprises at least one column that comprises several adsorbent beds Ai, whereby said beds are separated by at least one distributor plate Pi, several fluid transfer hoses such as injection hoses or draw-off hoses that extend between at least one distribution plate Pi and a point that is outside of the column, at least one distribution or draw-off network of the fluids.

It is characterized in that it comprises at least one trunnion-mounted ball valve that has one of the characteristics of one of claims 1 to 7, whereby said valve or valves makes it possible to link at least two plates of said column.

The device can comprise one or several by-pass lines Li,j, or shunt lines, whereby a by-pass line makes it possible to connect at least one of the transfer hoses that communicates with a plate Pi to at least one transfer hose that communicates with a plate Pj that is placed downstream from plate Pi by taking into consideration the direction of the swapping-out of the transfer lines; the trunnion-mounted ball valve makes it possible, for example, to link at least one of the transfer hoses with at least one of the plates.

The column comprises, for example, at least two networks for distributing fluids, whereby one of the networks is connected by at least one transfer hose to fluids that are to be injected at a first plate and the other network is connected by at least one transfer hose to fluids that are to be drawn off from a second plate.

The column can comprise at least two networks for distributing fluids, whereby one of the networks is connected by at least one transfer hose to secondary fluids that have a high flow rate and the other by at least one transfer hose to the secondary fluids of low flow rate.

According to an embodiment, the column comprises, for example, at least two distribution networks, whereby one of the networks is connected by at least one transfer line to the characteristic secondary fluids and the other network is connected to contaminated secondary fluids.

The object of the invention also relates to a process for separating a feedstock into a device in a simulated moving bed according to one of claims 9 to 13.

It is characterized in that a trunnion-mounted ball valve that comprises at least three fluid communication paths is used, and said valve is made to rotate to produce at least one circulation stage of at least one fluid (feedstock, desorbent, raffinate, extract or by-pass fluid) between at least one point that is outside of the column and at least one plate of said column or between at least two plates of said column, according to a sequence that makes it possible to carry out the separation of said feedstock.

The valve is put into rotation, for example, whereby the value of the rotary step is equal to a given angle value a to pass from one stage of the process to another stage.

It is also possible to put the valve into rotation with a value of the pitch of the angle of rotation that is equal to a given angle value a or to a multiple of this value during the same cycle for passing from one stage of the process to another stage.

For example, at least four trunnion-mounted ball valves are used, whereby each of said valves comprises three communication paths and two active positions, and whereby said valves are distributed between two distribution plates.

It is also possible to use a trunnion-mounted ball or an all-or-nothing valve to inject a fluid such as reflux at the column.

At least two trunnion-mounted ball valves are placed, for example, between two plates, whereby each of the valves comprises at least four fluid connections and three active positions.

It is possible to use an additional trunnion-mounted ball valve or an all-or-nothing valve to inject a fluid such as reflux in the column.

A trunnion-mounted ball valve that comprises at least eight connections and at least eight active positions is used, for example, between two distribution plates.

A valve that comprises twelve communication paths is used, for example, whereby six of these twelve paths are placed in the same plane and are active, and the other six are placed in a second plane and five of these six paths are active.

The valve is rotated by a constant pitch equal to an angle that is approximately equal to 45° in the same direction.

It is also possible to rotate the valve with a variable pitch during the rotation, according to a multiple of angle a.

The circulation of the fluids is carried out in independent distribution networks based on the value of the flow rate, high and low.

It is also possible to carry out the circulation of the fluids in independent distribution networks based on the nature of the fluid, characteristic secondary fluids and contaminated secondary fluids.

According to another implementation, the fluids are circulated by using independent distribution networks based on the function of fluids (injection or draw-off).

The object of the invention has at least the following advantages:
 a reduction of dead volumes in a T shape,
 to benefit from the reliability of the trunnion-mounted ball valves,
 to use less mechanical equipment.

Other advantages and characteristics of the device according to the invention will be better understood from reading the description below of a nonlimiting example by referring to the accompanying figures, where:

FIG. 1 shows a diagram of an adsorbent column for the simulated moving bed processes, equipped with a by-pass circuit according to the prior art, FIGS. 2A, 2B and 2C show diagrams of three possibilities for carrying out the grouping of fluids, such as feedstock, desorbent, raffinate and extract, FIGS. 3A, 3B and 3C show diagrams of a first variant of a circuit that is outside of the column that comprises trunnion-mounted valves according to the invention and the active positions of these valves, FIGS. 4A, 4B, 4C and 4D show another variant, FIGS. 5A, 5B, 5C and 5D show a variant embodiment along several sections and planes for a trunnion-mounted ball valve that comprises eight paths, FIG. 6 shows a composite view of the various states that the valve of FIG. 5A can assume, FIG. 7 shows a diagram of an example of sequence for a valve that comprises twelve paths, FIG. 8 shows another variant sequence, and FIGS. 9A and 9B show two variant embodiments that make possible the injection of a reflux at the separation column.

FIG. 1 shows a column for chromatographic separation of a feedstock of a simulated moving bed that comprises a number of beds An of an adsorbent that is suitable for producing the separation of the feedstock.

The adsorbent that is used can be a molecular sieve of BaX zeolithic type, for example, or any other type of adsorbents that are usually used in the area of the separation processes.

The main fluid circulates inside the column. It is drawn off in the lower portion of column 1 via line 2, picked up by a recycling pump 3 that is flow-regulated to be introduced into the upper end of the column via line 4. The flow of this fluid is of piston type inside the column. Several lines 5 make possible its introduction into upper adsorbent bed $A_1$.

To separate paraxylene from a xylene batch, the column generally comprises twenty-four beds that are distributed in four zones, whereby each of the zones is delimited by an injection of a fluid from the outside of the column (of desorbent or feedstock) and by a draw-off of another fluid (extract or raffinate), for example.

Thus, in the column that is provided as an example in FIG. 1, the first zone between the desorbent and the extract consists of four beds, the second zone between the extract and the feedstock consists of eleven beds, the third zone between the feedstock and the raffinate consists of six beds, and the fourth zone between the raffinate and the desorbent consists of three beds.

The plates that separate the various adsorbent beds are referenced Pi.

The column comprises hoses for introduction or for draw-off of secondary fluids that link with plates Pi.

The simulated moving bed comprises at least one draw-off point of an extract between the eluant injection point and the feedstock injection point that is located downstream from the direction of circulation of the eluent, and at least one draw-off point of a raffinate between the feedstock injection point and the eluent injection point that is located downstream in the direction of the circulation of the eluent.

Each plate comprises an upper lattice 6 and a lower lattice 7. The upper lattice, placed approximately perpendicularly to the axis of the column, supports the upper adsorbent bed and makes possible the flow of the main fluid and its collection. Lower lattice 7 makes it possible to uniformly distribute the fluid that is obtained from the mixing chamber at the next adsorbent bed. Two deflectors 8, for example, which are placed approximately along an approximately horizontal plane, are found between these two lattices. The plate furthermore comprises one or more chambers for mixing, injecting and/or drawing off a fluid. For example, in FIG. 1, chamber 9i makes it possible to distribute a fluid or to draw it off, and it is placed between two deflectors 8. A chamber 9i comprises one or more orifices 10 through which flows the secondary fluid to be introduced either in the next bed after having been mixed with the main fluid that has passed through the previous bed, or to be drawn off via the suitable transfer line.

The mixing chambers have not been presented in detail but can have shapes and be placed according to one of the variants that are described in Patents FR-2,708,480 and FR-2,738,064 of the applicant.

Each distributor plate Pi is connected to at least four transfer lines of secondary fluids which are not shown in the figure, corresponding to a feedstock injection line, a desorbent injection line, an extract draw-off line and a raffinate draw-off line. Each of these lines is equipped with a sequential valve that is shown symbolically by Vfi, Vei, Vsi and Vri, where index i corresponds to plate Pi and where f designates the feedstock, e designates the extract, s designates the desorbent and r designates the raffinate. The set of these valves is connected to sequential swapping-out means that are suitable for periodically advancing each secondary fluid injection point or secondary fluid draw-off point of a bed in the direction of circulation of the main fluid, i.e., from the top to the bottom to obtain simulated moving bed operation.

The circuit that makes it possible to produce the by-pass and to obtain a composition of a fluid that is approximately identical at all points of a plate comprises a by-pass line Li,j that connects two hoses for introduction or draw-off, and two plates. A by-pass line comprises, according to the prior art, at least one of the devices that are mentioned below, by itself or in combination, namely a nonreturn valve 11, a segregation valve, a flowmeter 12, and a control valve that may or may not be slaved to the flowmeter. A pump that is optionally placed on the by-pass line can optionally supply an inadequate pressure drop.

The valve that equips the by-pass or by-pass line is referenced Voi,j where index o corresponds to the by-pass function and indices i, j correspond to the plates between which the by-pass is carried out.

In a more general manner, a simulated moving bed comprises at least three chromatographic zones, advantageously four or five, whereby each of these zones consists of at least one column or column section. The set of these columns or column sections forms a closed loop, whereby the recycling pump between two sections is regulated in flow.

FIGS. 2A, 2B, and 2C show diagrams of several composite examples of different secondary fluids according to the prior art.

FIG. 2A showed an arrangement for the circulation lines of fluids where the four secondary flows are grouped by function and two by two, i.e., injection, on the one hand, for the feedstock and the desorbent, and draw-off, on the other hand, for the extract and the refining. In this example, the column comprises two distribution baskets (draw-off or injection) that empty into each plate.

The extract and the raffinate are drawn off from plate Pn via a hose 20 which is subdivided into two hoses 20a, 20b, whereby the two hoses are provided with all-or-nothing valves.

The feedstock and the desorbent come in through two hoses 21a, 21b that are each equipped with an all-or-nothing valve, and the two hoses combine into a single hose 21 that communicates with distribution plate Pn+1.

By-pass line 22 is in this case provided with a nonreturn valve 23.

Lines 20a, 20b, 21a, 21b, 20 and 21 as well as purge line 24 are equipped with valves that make it possible to isolate and evacuate the by-pass.

FIG. 2B shows a diagram of an example where the four secondary flows are grouped by a range of flow rates, low flow rate for the feedstock and extract and high flow rate for the desorbent and raffinate.

In this example, in addition to a nonreturn valve, by-pass line 22 is provided with an all-or-nothing valve 25 that makes it possible to inject or to draw off a plate at the same time.

Plate Pn is connected to a hose 26 that makes it possible tc, draw off the raffinate via hose 26a and to inject the desorbent via hose 27b, 22 and 26. High flow rate.

At plate Pn+1, the feedstock is injected via a hose 27a, 27, and the extract is drawn off via hoses 27, 22, 26b.

FIG. 2C shows an example where the four flows are grouped by nature of fluids, characteristic fluids such as desorbent and extract, and contaminated fluids for the feedstock and the raffinate.

From plate Pn, extract is drawn off via hoses 28 and 28a, and the desorbent is injected into the column via a hose 29b, by-pass line 22 and hose 28.

At plate Pn+1, the feedstock is injected via hose 29, a hose 29a that is connected to a connecting line and a collecting pipe, and the raffinate is extracted via hose 29, by-pass line 22 and a hose 28b.

In the embodiments that are provided in FIGS. 2A to 2C, the column comprises at least two systems or baskets that make it possible to distribute or to draw off the secondary fluids at the plates of the column.

One of the possible sequences for carrying out the different stages that are implemented in a process for separation in a simulated moving bed consists in, after a stage of draw-off or injection of a secondary fluid, carrying out a by-pass stage between two plates Pi, Pj.

Indices i and j can follow one another or else correspond to plates that are separated by a number of adsorbent beds that is greater than 1.

A sequential cycle can comprise, for example, the following stages:

1) Injection of the feedstock at plate Pn+1,
2) By-pass between plate Pn and plate Pn+1
3) Draw-off of the extract from plate Pn
4) By-pass
5) Injection of desorbent at plate Pn+1
6) By-pass
7) Draw-off of raffinate from plate Pn
8) By-pass.

Of course, without exceeding the scope of the invention, the cycle that is described above can begin at a different stage than that of the injection of the feedstock.

It can also comprise a stage that makes it possible to inject in the column a reflux that is described in, for example, FIGS. 9A and 9B. The reflux injection stage is carried out between stages 2) and 3) of the base cycle that is described above and comprises an injection stage of the reflux followed by a by-pass stage.

In the same way, the examples of external circuits that are provided in FIGS. 3A to 3C can be applied for the different grouping types that are provided above in FIGS. 2A to 2C.

The principle of the invention consists in particular in replacing, for example, all of the devices (valves, flowmeter) that equip by-pass line Li,j that is diagrammed in FIG. 1 by a trunnion-mounted ball valve and to arrange the connections of the valve with hoses for circulating secondary fluids according to different variants. These variant arrangements can depend on the grouping of the secondary fluids or else the cycle of the process.

In the following figures, and for reasons of simplification, only one portion of the external circuit for circulation of secondary fluids in the separation column has been shown, and more particularly the connection between a stage n and a stage n+1 of the column, or plates Pn, Pn+1.

In FIG. 3A, the outside circulation circuit comprises four trunnion-mounted ball valves, whereby each valve comprises three paths and two active positions that are shown in, for example, FIGS. 3B and 3C.

These valves are placed relative to a set of injection hoses, draw-off hoses and the by-pass line, that comprise, for example: a hose 30 that makes possible the draw-off of the extract from stage n or plate Pn, a hose 31 for evacuating the extract, a hose 33 in connection with plate Pn+1, a hose 34 that makes it possible to extract the raffinate, a hose 35 for injecting the feedstock, a hose 36 for injecting desorbent, a by-pass line 32 that is divided into a first section 32a, a second section 32b and a third section 32c.

The distribution of four valves V1, V2, V3 and V4 is as follows: V1 is connected to hoses 30, 31 and to by-pass 32a; V2 is connected to hose 34 and the sections of by-pass 32a, and 32b; V3 is connected to hoses 35 and the sections of by-pass line 32b, 32c; and valve V4 is connected to by-pass 32c and to hoses 36 and 33.

This distribution has been presented in detail for the by-pass line between plates Pn and Pn+1, but it can be found again in the twenty-three other by-pass lines.

FIGS. 3B and 3C (state A and state B) show diagrams of the active positions that are taken by these valves, whereby state A corresponds to an injection or draw-off stage, and stage B corresponds to a by-pass stage.

Conventionally, phase 1 of the cycle corresponds to the injection of desorbent in bed No. 1. The positioning sequences of the valves or of the valve that is located on the synchronous by-pass that connect beds n and n+1 are examined.

The opening and closing sequence of the valves is as follows, for example:

Period 1

The first, third and fourth valves, V1, V3, V4 are in by-pass position (stage n to stage n+1), second valve V2 is in a position for sampling the raffinate.

Periods 2 to 6

The four valves are in by-pass position (stage n to stage n+1).

Period 7

The first, second and fourth valves, respectively V1, V2 and V4, are in by-pass position (stage n to stage n+1), third valve V3 is in feedstock injection position.

Periods 8 to 16

The four valves V1, V2, V3, and V4 are in by-pass position (stage n to stage n+1).

Period 17

The second, third and fourth valves V2, V3 and V4 are in by-pass position (stage n to stage n+1), first valve V1 is in extract sampling position.

Periods 18 to 21

The four valves V1, V2, V3, and V4 are in bypass position (stage n to stage n+1).

Period 22

The first, second and third valves V1, V2 and V3 are in by-pass position (stage n to stage n+1), and fourth valve V1 is in desorbent injection position.

Periods 23 to 24

The four valves V1, V2, V3 and V4 are in by-pass position (stage n to stage n+1).

The sequencing of the valves that are located on the twenty-three other by-pass lines is obtained by circular swapping-out.

FIGS. 4A to 4D show diagrams of another variant embodiment where the valves that are used are of the trunnion-mounted ball type with four paths and three active positions in dotted lines in the FIGS.

In this case, the outside circuit comprises a hose 40 that is connected to plate Pn and a hose 41 that communicates with plate Pn+1, a by-pass line 42, hoses 43, 45 that make it possible to extract the raffinate and the extract, hoses 44, 46 for injection of the feedstock and desorbent.

Two valves Vn and Vn+1 with four paths and three active positions, whereby valve Vn is connected to hoses 40, 43, 44 and by-pass 42 and valve Vn+1 is connected to with hoses 41, 45 and by-pass 42.

The positioning sequence of valves Vn and Vn+1 that are placed between stages n and n+1, i.e., corresponding to plates Pn and Pn+1 is as follows, for example:

Period 1

Second valve Vn+1, is in by-pass position B, stage n to stage n+1, the first valve is in position A (FIG. 4B); raffinate sampling.

Periods 2 to 6

The two valves Vn and Vn+1 are in by-pass position B, stage n to stage n+1, (FIG. 4C)

Period 7

The second valve is in by-pass position, stage n to stage n+1, first valve Vn is in position C (FIG. 4D); feedstock injection.

Periods 8 to 16

The two valves Vn and Vn+1 are in by-pass position B (stage n to stage n+1).

Period 17

First valve Vn is in by-pass position B (stage n to stage n+1); the second valve is in position A (FIG. 4B); extract sampling.

Periods 18 to 21

The two valves Vn and Vn+1 are in by-pass position B (FIG. 4C), stage n to stage n+1.

Period 22

First valve Vn is in by-pass position B (stage n to stage n+1); second valve Vn+1 is in position C (FIG. 4D): desorbent injection.

Periods 23 to 24

The two valves Vn and Vn+1 are in by-pass position (stage n to stage n+1).

The sequencing of the other valves that are located on twenty-three other by-passes are obtained by circular swapping-out.

FIGS. 5A, 5B, 5C, and 5D, as well as FIG. 6 shows diagrams respectively of a trunnion-mounted ball valve variant that comprises eight paths and the positions that it takes during different sequences.

FIG. 5A shows diagrammatically the trunnion-mounted ball valve where communication paths with the hoses for injection, extraction and by-pass are distributed over two planes referenced $P_A$ and $P_B$.

FIGS. 5B, 5C and 5D represent the male and female parts in plane $P_A$ and the female part in plane $P_B$.

At plane $P_A$, the internal portion of the valve comprises at least one channel 50 which will make possible the circulation of fluids between two adsorbent beds, therefore between two plates Pi. The outside portion of the valve comprises in this plane $P_A$ orifices $O_A$ that are four in number in this example ($O_{A1}$, $O_{A2}$, $O_{A3}$, $O_{A4}$), which will make it possible to link the hoses for circulating fluids and the plate. These orifices $O_A$ are distributed, for example, every 90°.

Placed in plane $P_B$ are orifices $O_B$, which will make it possible for fluids to circulate from a point outside of the column to a plate Pi. These orifices $O_B$ number 4, for example ($O_{B1}$, $O_{B2}$, $O_{B3}$, $O_{B4}$) and are distributed every 90°.

At least one channel 51 to ensure the connection (circulation of fluids) between two beds, therefore between two plates Pi and Pj, is found between planes $P_A$ and $P_B$.

Two channels 50 and 51 are independent.

Two orifices $O_a$ and $O_B$ that follow are offset, for example, by an angle of 45°.

The valve is mobile in rotation around an approximately vertical axis.

The stages for carrying out the separation of the feedstock in a simulated moving bed are obtained by varying the positions of the valve by a constant pitch that is equal to a value of angle α or else by the variable pitch of rotation that uses a multiple of angle α. The sequence is based on the technology of the valve and its applications.

Figure 6:
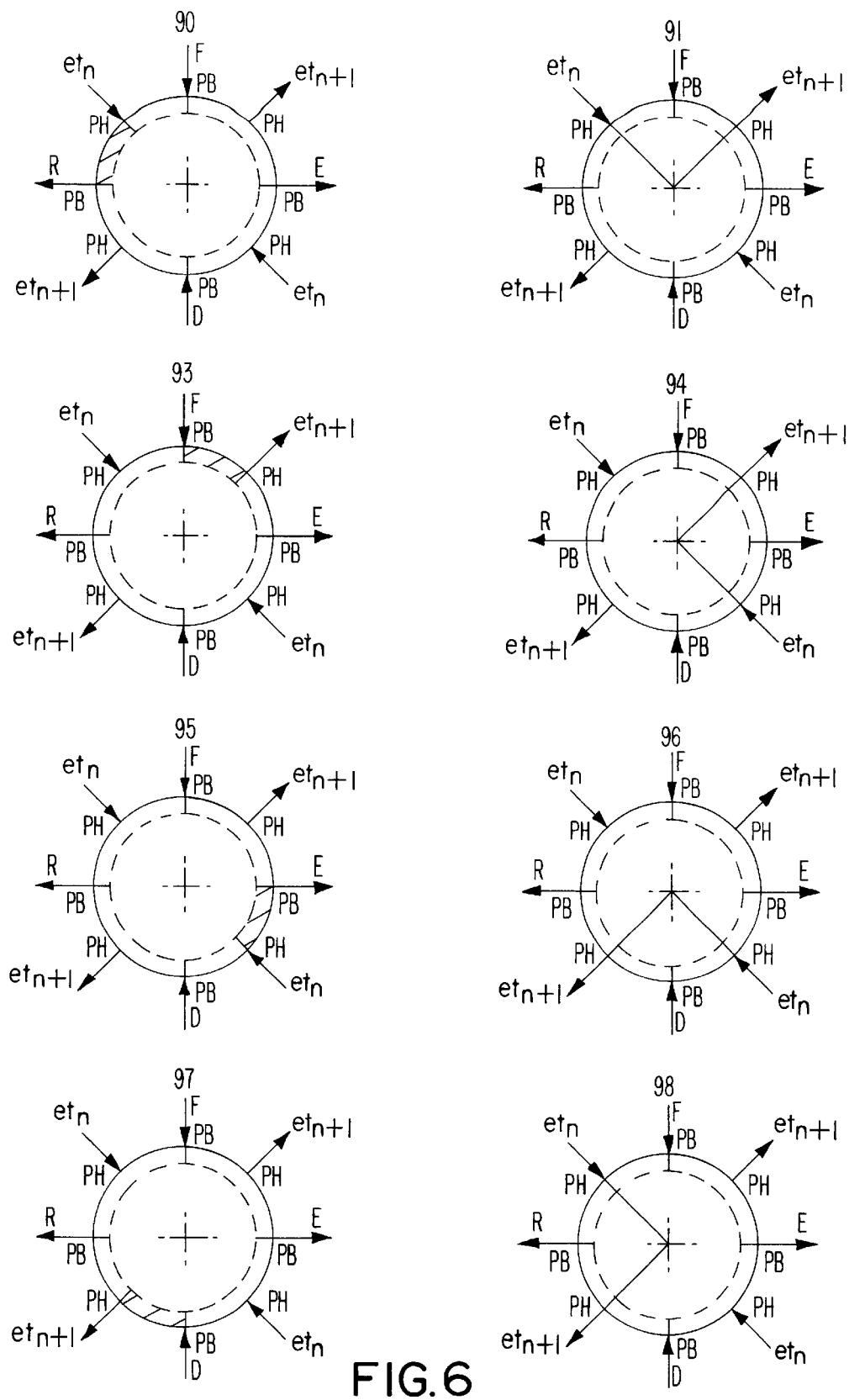

Without exceeding the scope of the invention, channels 50 and 51 can be replaced by grooves, slots, or any other means that makes it possible to merge several fluids alternately in the same way as that described in FIGS. 5A and 6.

According to an embodiment of the invention, the valve comprises a wow line, not shown, that communicates with channel 51 and that is connected to a general outside circuit for runoff from the separation unit.

For the variant that is provided in FIGS. 5A to 5D, FIG. 6 shows the different values that are taken by the angle of rotation during the rotation of the valve and the circulation diagram of the secondary fluids.

For a trunnion-mounted ball valve that comprises eight paths and that is placed between plate Pn and plate Pn+1, the sequence for carrying out the different separation stages can be as follows:

Period 1

The valve is in position q1=0°: sampling of raffinate from plate Pn. This corresponds to the linking of the two planes via channel 51.

Periods 2 to 6

The valve is in position q2=45°: by-pass (stage n to stage n+1), and this corresponds to linking two orifices that are placed in the same plane via channel 50.

Period 7

The valve is in position q3=90°: injection of feedstock at plate Pn+1.

Periods 8 to 16

The valve is in position q4=135°: by-pass (stage n to stage n+1).

Period 17

The valve is in position q5=180°: extract sampling from plate Pn.

Periods 18 to 21

The valve is in position q6=225°: by-pass (stage n to stage n+1).

Period 22

The valve is in position q7=270°: desorbent injection at plate Pn+1.

Periods 23 to 24

The valve is in position q8=315°: by-pass (stage n to stage n+1.

The sequencing of valves that are located on the twenty-three other by-passes are obtained by circular swapping-out.

Figure 7:
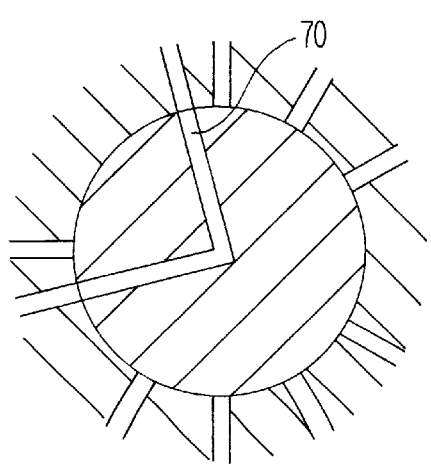

FIG. 7 shows in a diagram in section a valve that comprises twelve paths and in the same plane a channel 70 that makes an angle of 90° for linking either two plates (two beds) or a plate (bed) with a point that is outside of the column.

To carry out the process of separation according to the invention, the valve is rotated around its axis of rotation by a pitch that corresponds to a rotation angle value α of 30° or else to a multiple.

| Position | $O_{12}$—$O_9$ | $O_{11}$—$O_8$ | $O_9$—$O_6$ | $O_8$—$O_5$ | $O_7$—$O_4$ | $O_5$—$O_2$ | $O_4$—$O_1$ | $O_2$—$O_{11}$ |
|---|---|---|---|---|---|---|---|---|
| angle ° | 0 | 30 | 90 | 120 | 150 | 210 | 240 | 300 |
| function | injection of the feedstock | bypass | draw-off of extract | bypass | injection of desorbent | bypass | draw-off of raffinate | bypass |

Figure 1:
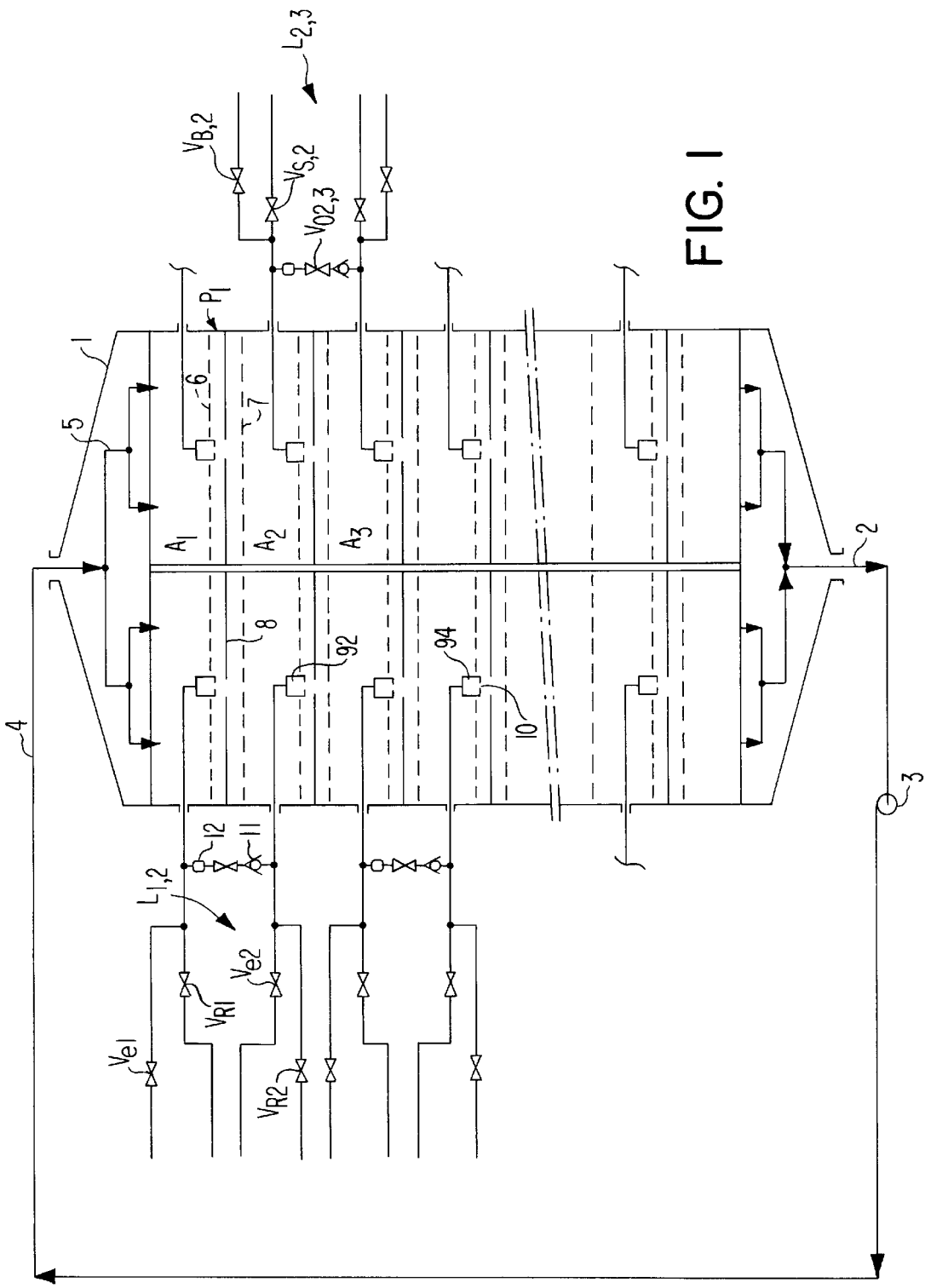
Figure 2A:
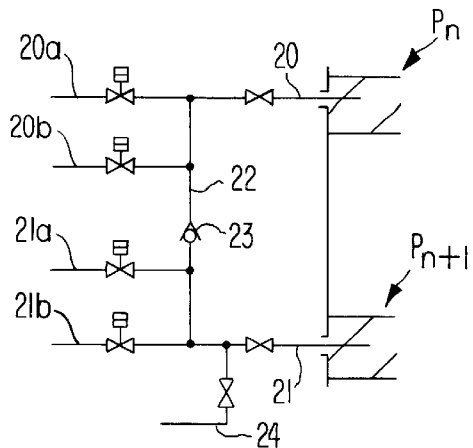
Figure 2B:
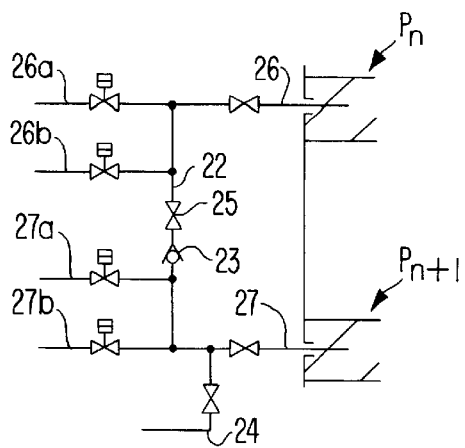
Figure 2C:
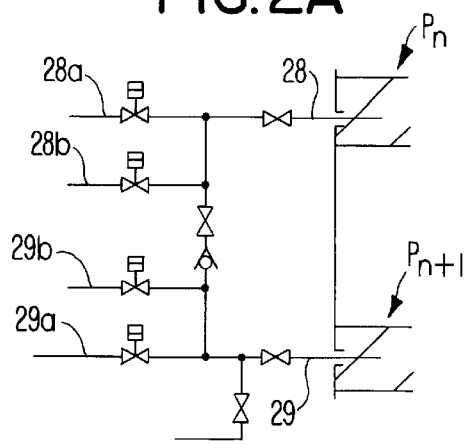

This type of trunnion-mounted ball valve and sequence is applied, for example, in processes of separation where fluids are grouped by nature, as was mentioned in FIG. 2C.

Figure 8:
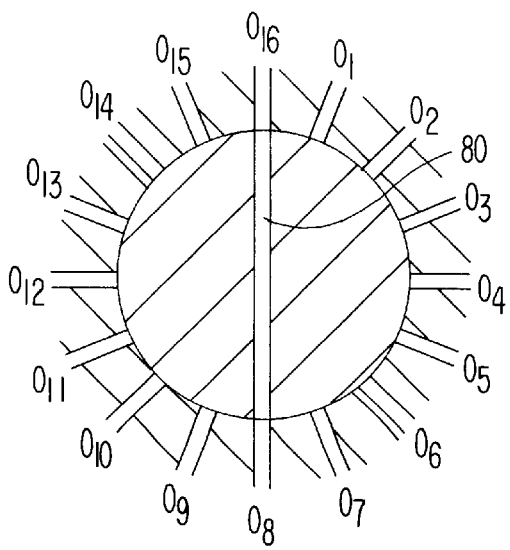

In the case of a grouping of fluids by function, i.e., injection and draw-off, a variant arrangement of the elements is shown in a diagram in FIG. 8, where channel 80 for merging fluids passes through the valve in the same plane.

The value of the angle of rotation is 22.5°=α1.

| Position | $O_{16}$—$O_8$ | $O_{17}$—$O_7$ | $O_{14}$—$O_6$ | $O_{13}$—$O_5$ | $O_{12}$—$O_4$ | $O_{11}$—$O_3$ | $O_{10}$—$O_2$ | $O_9$—$O_1$ |
|---|---|---|---|---|---|---|---|---|
| angle | 0 | α1 | 2α1 | 3α1 | 4α1 | 5α1 | 6α1 | 7α1 |
| function | injection of the feedstock | bypass | draw-off of extract | bypass | injection of desorbent | bypass | draw-off of raffinate | bypass |

Figure 9A:
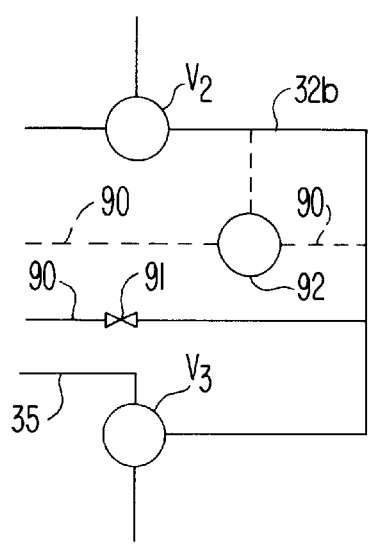
Figure 9B:
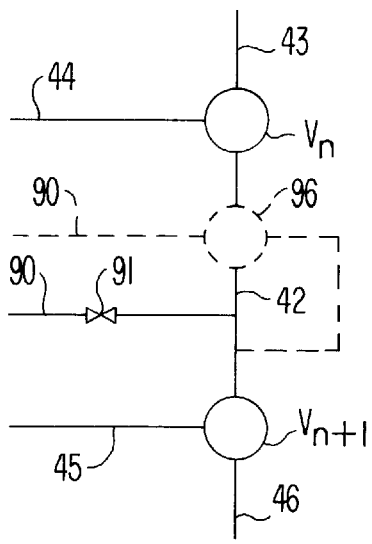

FIGS. 9A and 9B show diagrams of two other embodiments of the invention that are provided by way of illustrative and nonlimiting example where a fifth fluid or reflux is injected at the column.

Figure 3A:
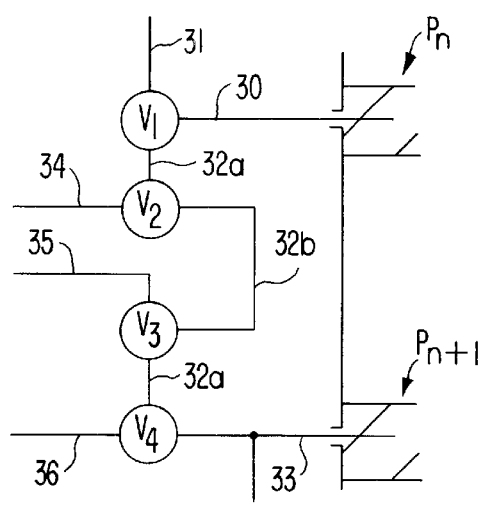
Figure 3B:
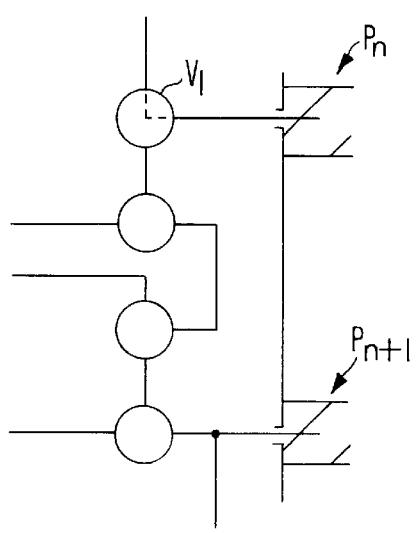
Figure 3C:
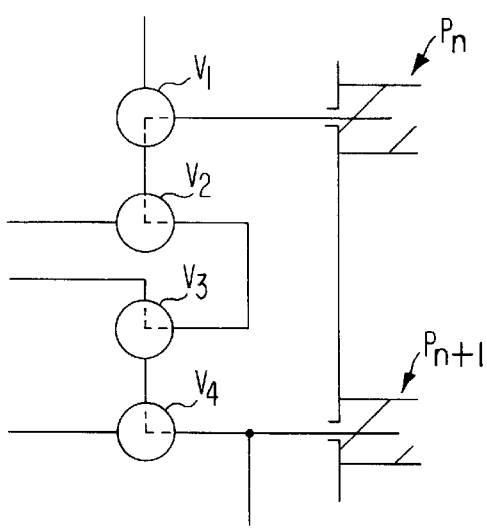

These figures correspond to FIGS. 3A and 4B, and to a variant that is derived from the trunnion-mounted ball valve that comprises two planes (FIG. 5A).

For all of these variant embodiments, the reflux is generally injected with a flow rate that is lower than the flow rates of other fluids.

The sequence of injection and draw-off of the different fluids during a cycle of the process of separation can be as follows:

1) Injection of the feedstock at plate Pn+1,
2) By-pass between plate Pn and plate Pn+1,
3) Injection of reflux
4) By-pass
5) Draw-off of the extract from plate Pn
6) By-pass
7) Injection of desorbent at plate Pn+1
8) By-pass
9) Draw-off of the raffinate from plate Pn
10) By-pass.

Whereby stages 3) and 4) of this cycle are additional stages relative to the base sequence that is taken as an illustrative example of the invention.

FIGS. 9A and 9B show diagrams only of the connection between the line that is used for injecting the reflux and the by-pass line according to two different embodiments, whereby the preferred mode is indicated in solid lines and the other mode is indicated in dotted lines.

In FIG. 9A, a line 90 that makes it possible to inject the reflux is connected to shunt line or by-pass line 32b via an all-or-nothing valve 91.

According to another embodiment, the arrangement comprises a trunnion-mounted ball valve with three paths and two active positions that is similar to valves that are used in FIG. 3A. Valve 92 is connected to section 32b of the by-pass by three hoses 93, 94 and 95, and hose 90 for introducing the reflux is connected to hose 95 to carry out the sequence that is described above.

FIG. 9B shows two possible variant implementations.

Hose 90 for introducing the reflux is connected to by-pass 42 with an all-or-nothing valve 91.

According to a second possible implementation, a valve 95 with four paths and three active positions, for example, is inserted in by-pass 42.

According to another embodiment, the valve comprises more than four paths, whereby the different paths are placed in two planes $P_A$ and $P_B$.

In this case, the by-pass line is equipped with a single valve to carry out the different stages of the separation process that are cited above as an example.

In plane $P_A$, the valve comprises six paths for merging fluids and in plane $P_B$, the valve comprises six paths, of which one is not active.

In all of the variant embodiments that are described above, the direction of rotation has been made in counter-clockwise direction.

The value of the angle and its movement in a constant manner or a multiple of the base value is based on particularly the number of communication channels and the sequence of merging the fluids to carry out the separation of the feedstock and the by-pass.

In all of the cases, one of the conditions of good operation of the process implies that the number of channels and the distribution of the orifices at the trunnion-mounted ball valve are such that the fluids that are outside of the column, generally the secondary fluids, are merged with one of the beds of the column a single time during a cycle.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/09.824, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A system that makes it possible to merge at least four fluids with a column for separating a feedstock, said column comprising several hoses for introduction or draw-off of one or more fluids, wherein said system comprises at least one trunnion-mounted ball valve, whereby said valve comprises several openings ($O_A$, $O_B$) connected to said hoses, several communication means (50, 51) placed inside said valve that make it possible to circulate one or more fluids, between two zones of said column, or between at least one of said zones and at least one point outside of said column, said communication means comprising a first channel (50) placed in a first plane ($P_A$) of said valve, and a second channel (51) placed between said first plane ($P_A$) and a second plane ($P_B$) of said valve and wherein said openings ($O_A$, $O_B$) are divided and distributed at the first and second planes.

2. A system according to claim 1, wherein said trunnion-mounted ball valve comprises at least three openings and at least two active positions.

3. A system according to claim 1, wherein said trunnion-mounted ball valve comprises at least three openings and at least three active positions.

4. A system according to claim 1, wherein said trunnion-mounted ball valve comprises eight openings and eight active positions.

5. A system according to claim 4, wherein four openings are divided at said first plane ($P_A$) and four openings are divided at said second ($P_B$).

6. A system according to claim 5, wherein four openings are positioned at first plane ($P_A$) to ensure connection between two zones of the column, and four openings are positioned at said second plane ($P_B$) to ensure connection between at least one of the zones of said column and at least one point outside of said column.

7. A system according to claim 1, wherein said system further comprises a purge line connecting said trunnion-mounted ball valve with said communication means.

8. A system according to claim 1, wherein said column comprises several adsorbent beds Ai, separated by at least one distributor plate Pi, several fluid transfer hoses that extend between at least one distribution plate Pi and a point outside of the column, and at least one network for distribution or draw-off of the fluids, said trunnion-mounted ball valve making it possible to link at least two plates of said column.

9. A system according to claim 8, comprising at least one by-pass or shunt lines, a by-pass line (Li, j) that makes it possible to connect at least one of the transfer hoses that communicate with a plate Pi to at least one transfer hose that communicates with a plate Pj located downstream from plate Pi, wherein said trunnion-mounted ball valve links at least one of the transfer hoses with at least one of the plates.

10. A system according to claim 8, wherein the column comprises at least two networks for distributing fluids, wherein one of the networks is connected by at least one transfer hose to the fluids that are to be injected at a first plate and the other network is connected by at least one fluid transfer hose to be drawn off from a second plate.

11. A system according to claim 8, wherein the column comprises at least two fluid distribution networks, whereby one of the networks is connected by at least one transfer hose to the secondary fluids that have a high flow rate, and the other network is connected by at least one transfer hose to the secondary fluids that have a low flow rate.

12. A system according to claim 8, wherein the column comprises at least two distribution networks, whereby one of the networks is connected by at least one transfer hose to uncontaminated secondary fluids and the other network is connected to contaminated secondary fluids.

13. A system according to claim 1, further comprising one or more by-pass lines (Li, j) that equip said separation column, whereby said by-pass line or lines are placed between at least two plates Pi, Pj of said separation column.

14. A process for separation of a feedstock in a system comprising a column, several hoses for introduction or draw-off one or more fluids, a trunnion-mounted ball valve having at least three openings ($O_A$, $O_B$) connected to said hoses, a first channel (50) that is placed in a first plane ($P_A$) of said valve to ensure connection between two zones of the column, a second channel (51) that is placed between said first plane ($P_A$) and a second plane ($P_B$) of said valve to ensure connection between at least one of the zones of said column and at least one point outside of said columns, said openings ($O_A$, $O_B$) being divided and distributed at said first and second planes, wherein said valve is actuated to produce at least one circulation stage of at least one fluid selected from the group consisting of feedstock, desorbent, raffinate, extract and by-pass fluid between at least one point that is outside of the column and at least one zone of said column or between at least two zones of said column, according to a sequence that makes it possible to carry out the separation of said feedstock.

15. A process for separating a feedstock according to claim 14, wherein the valve is rotated, whereby the value of the pitch of rotation is equal to a given angle value ÿ to pass from one stage of the process to the next.

16. A process for separating a feedstock according to claim 14, wherein the valve is rotated, whereby the value of the pitch of rotation is equal to a given angle value ÿ or to a multiple of this value during the same cycle to pass from one stage of the process to the next.

17. A process of separation according to claim 14, wherein at least four trunnion-mounted ball valves are used, whereby each of said valves comprises three openings and two active positions, whereby said valves are distributed between two zones of said column.

18. A process according to claim 17, wherein a trunnion-mounted ball valve or an all-or-nothing valve is used to inject a fluid such as reflux at the column.

19. A process of separation according to claim 14, wherein at least two trunnion-mounted ball valves are placed between two zones of said column, whereby each of the valves comprises at least four openings and three active positions.

20. A process according to claim 19, wherein an additional trunnion-mounted ball valve or an all-or-nothing valve is used to inject a fluid such as reflux into the column.

21. A process according to claim 20, wherein a trunnion-mounted ball valve comprising at least eight connections and at least eight active positions is used between two zones of said column.

22. A process according to claim 14, wherein a trunnion-mounted ball valve that comprises twelve openings is used, whereby six of these twelve openings are placed in the same plane of said valve and are active, and the other six are placed in a second plane and five of these six paths are active.

23. A process according to claim 14, wherein said valve is rotated by constant pitch that is equal to an angle $\ddot{y}$ that is approximately equal to 45° in the same direction, or according to a multiple of angle $\ddot{y}$.

24. A process of separation according to claim 14, wherein the circulation of the fluids is carried out in independent distribution networks and is based on the value of the flow rate, high and low.

25. A process of separation in a simulated moving bed according to claim 14, wherein the circulation of the fluids is carried out in independent distribution networks and is based on the nature of the fluid, characteristic secondary fluids and contaminated secondary fluids.

26. A process of separation in a simulated mobile bed according to claim 14, wherein the fluids are circulated by using independent distribution networks based on the function of fluids (injection or draw-off).

\* \* \* \* \*